Aug. 17, 1965
YOSHIKAZU KUZE
3,200,593
HYDROSTATIC TRANSMISSION
Filed May 25, 1962
3 Sheets-Sheet 1
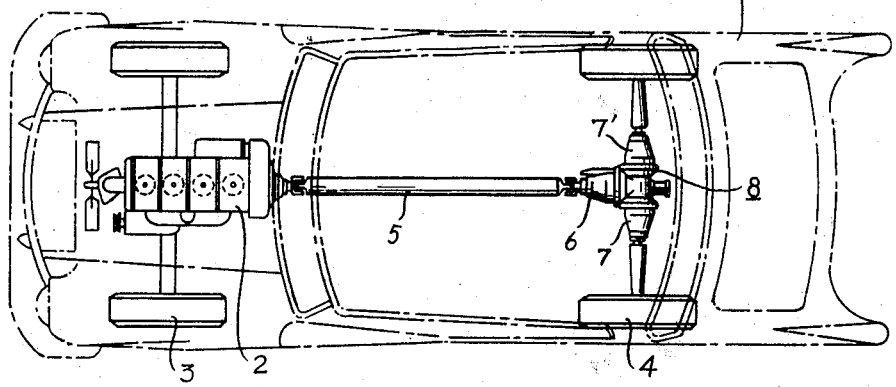
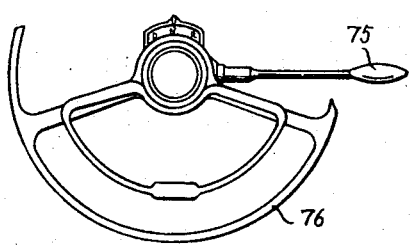
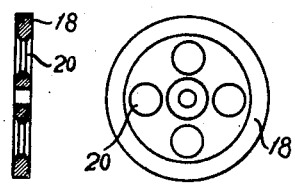
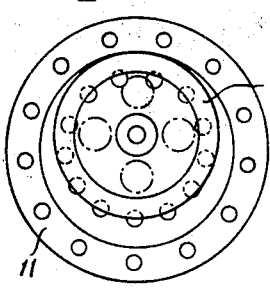
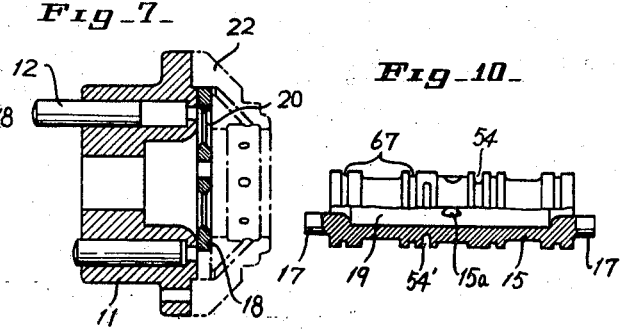
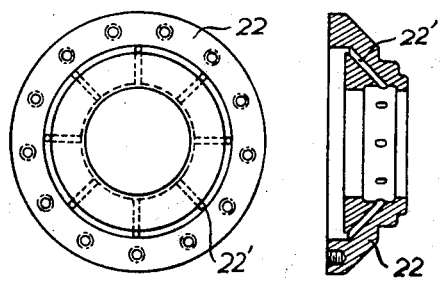
INVENTOR.
Yoshikazu Kuze
BY
Stevens, Davis, Miller & Mosher
Attorneys Aug. 17, 1965  YOSHIKAZU KUZE  3,200,593
HYDROSTATIC TRANSMISSION
Filed May 25, 1962  3 Sheets-Sheet 2

INVENTOR
Yoshikazu Kuze
BY
ATTORNEYS

Aug. 17, 1965 YOSHIKAZU KUZE 3,200,593
HYDROSTATIC TRANSMISSION
Filed May 25, 1962 3 Sheets-Sheet 3
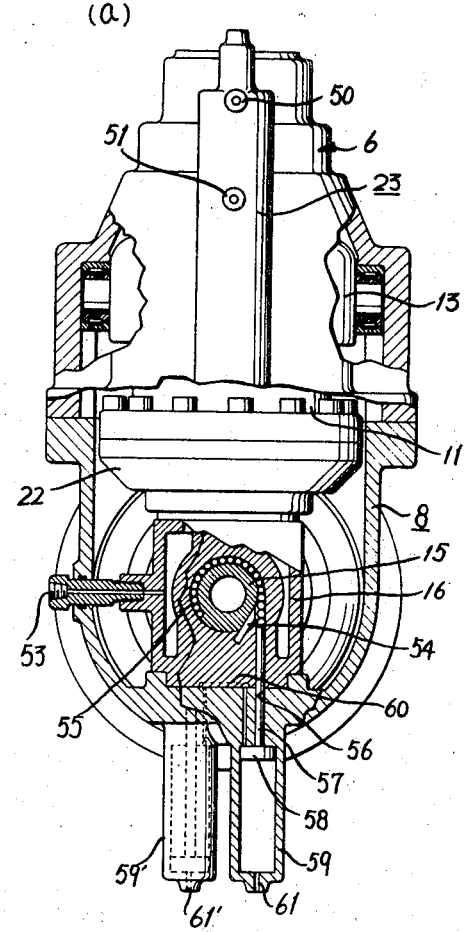
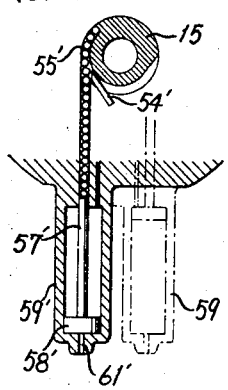
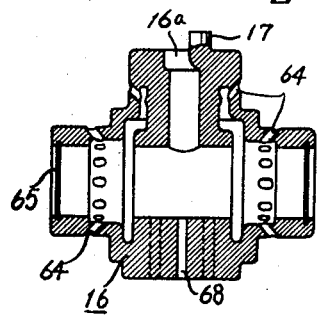
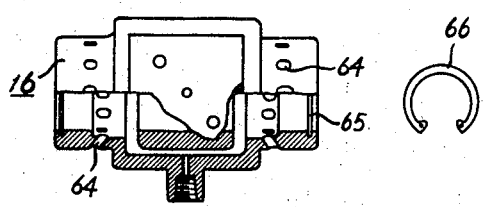
INVENTOR
Yoshikazu Kuze
BY
Stevens, Davis, Miller & Mosher
ATTORNEYS 3,200,593
HYDROSTATIC TRANSMISSION
Yoshikazu Kuze, 64 Chidori-cho, Chofu,
Ota-ku, Tokyo, Japan
Filed May 25, 1962, Ser. No. 197,687
Claims priority, application Japan, June 6, 1961,
36/20,041, 36/20,042
6 Claims. (Cl. 60—53)

This invention relates to hydraulic power transmission devices applicable to driving vehicles, particularly, automobiles.

An object of the invention is to provide an hydraulic power transmission device wherein an automatic speed change in response to changing loads, reverse of rotation and braking of wheels is performed by purely hydraulic means without the use of mechanical clutches, transmission gears, differential gears and brake means.

For a better understanding of the invention reference is had to the accompanying drawings, in which, FIG. 1 shows an automobile illustrating the invention in its simplest form;

FIG. 3a is its longitudinal sectional side view of the device of FIGURE 2;

FIG. 3b shows a part of the device in detail;

FIG. 4 is a front elevation of a valve plate;

FIG. 5 is its longitudinal sectional view of FIGURE 4;

FIG. 6 is a front elevation of the valve plate showing its position relative to a cylinder block;

FIG. 7 is its longitudinal sectional side view of FIGURE 6;

FIG. 8 is a front view of an oil distributing block;

FIG. 9 is its longitudinal sectional side view;

FIG. 10 is a side view of an oil supply manifold partly in section;

FIG. 11 is a longitudinal sectional front view of an oil passage constituting member;

FIG. 12 is its transverse sectional plan view;

FIG. 13 is a plan view of a clamping ring; and

FIGURE 14 shows an automobile steering wheel and shift lever.

Figure 2:
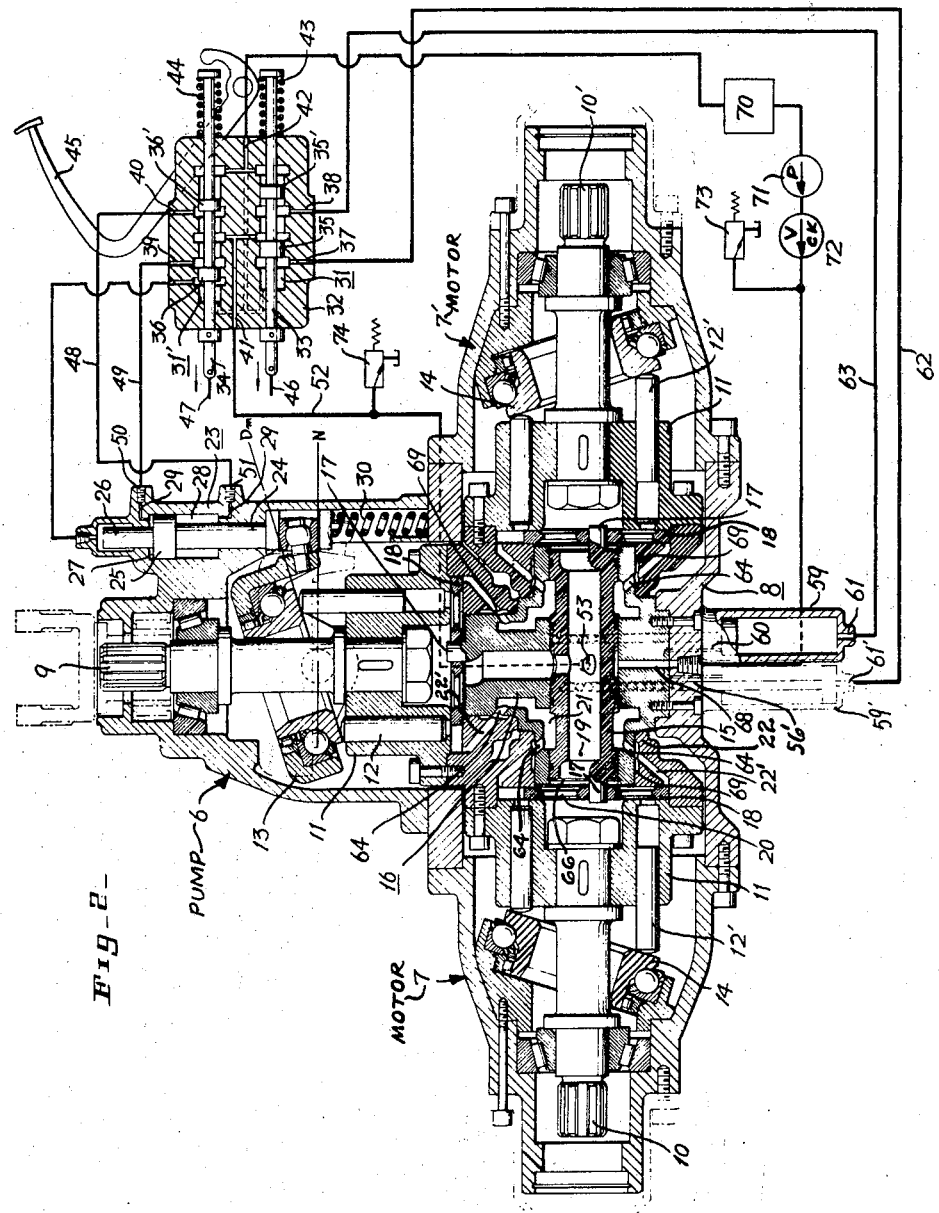
FIG. 2 is a transverse sectional plan view of the hydraulic device which is generally shown in FIG. 1.

An hydraulic power transmission device incoroprating the invention and applied to an automobile will be described with reference to all of the drawings, in which 1 designates a car body; 2 an engine; 3 and 4 a front wheel and a rear wheel, respectively; 5 a drive shaft; 6 a variable displacement oil pump; and 7, 7′ oil motors having rotating shafts aligned on a straight line and arranged symmetrically in opposition and with their shafts perpendicularly disposed relative to the rotating axis of the pump shaft. Said pump and motors are hydraulically coupled together by hydraulic coupling means which comprises oil passage members which couple the motors to each other in balanced condition. With reference to FIGURE 2, the input shaft of the variable displacement oil pump 6 is hydraulically coupled to the output shafts of the oil motors 7, 7′ through said oil passage members which comprise a first generally inverted T-shaped member 16 (as seen in FIGURE 2) which includes a bore extending from end to end in correspondence to the horizontal portion of the T, and a second member or manifold 15 which is rotatably journalled in said bore. Members 15 and 16 include passages which connect the suction sides of the oil motors 7, 7′ to the discharge side of the oil pump 6.

Numeral 8 designates a casing enclosing said members 16 and 15; 9 an input shaft for the pump 6; 10, 10′ output shafts for the oil motors 7, 7′; 11 respective cylinder blocks secured to each of the rotating shafts 9, 10, 10′ of the oil pump 6 and of the oil motors 7, 7′; 12, 12′, 12′ respective groups of plungers concentrically arranged in the respective blocks 11; 13 a movable swash plate arranged in opposition to the group of plungers 12 for the oil pump 6; 14 fixed swash plates arranged in opposition to groups of plungers 12′, 12′ for the oil motors; 17 pins secured to opposite ends of the second member 15 and to one end of first member 16, said pins being eccentric relative to the rotational axes of shafts 10, 10′ and 9, respectively. Numeral 18 designates three separate valve plates freely mounted on the respective pins 17; 19 a low pressure oil passage extending through the manifold 15 and the T type oil passage member 16; 20 openings formed in the valve plates 18 to communicate the passage 19 with the groups of plungers 12′; 21 high pressure oil passage or chamber formed between the outer periphery of the manifold 15 and an axially opening annular chamber formed in the circumferential wall of T type oil passage member 16; and 22 respective oil distributing blocks having respective oil passages 22′ adapted to communicate the passage or chamber 21 with the groups of plungers 12, 12′, 12′ not covered by the respective valve plates 18. One block 22 is secured to the cylinder block 11 and is adapted to rotate around the outer periphery of the T type oil passage member 16. The valve plate 18 associated with the pump is loosely fitted in an air gap formed between the oil distributing block 22 and the cylinder block 11.

Numeral 23 designates a speed control cylinder for controlling the inclined position of the movable swash plate 13 provided in the oil pump 6; 24 a piston rod having an end connected to a free end of the movable swash plate 13; 25 a piston enclosed in the cylinder 23; 26 a piston rod connected to the side of the piston 25 opposite to the rod 24 and reduced in diameter; 27, 28 chambers defined in the cylinder 23 between the cylinder ends and opposite faces of the piston 25; 29 a dash-pot mechanism arranged in an opening in the cylinder 23; 30 a spring adapted to aid the oil pressure in the chamber 28 which is lower than in the chamber 27 due to the difference of diameters of the piston rods 24, 26. Numerals 31, 31′ designates change-over valve cylinders; 32 a casing for the change-over valve cylinders; 33 and 34 a change-over rod for reversing the direction of rotation of the oil motors from forward to reverse or vice versa and a change-over rod for maintaining a neutral position, respectively, each slidably mounted in the change-over valve cylinders 31, 31′; 35, 35′, 36, 36′ valve bodies secured to these change-over rods, respectively; 37–42 openings formed in the casing 32; 43, 44 springs for controlling the change-over rods 33, 34, respectively; 45 a brake pedal adapted to be engaged with the change-over rod 34; 46, 47 cables for operating the change-over rods 33, 34, respectively; 48, 49 oil passages for connecting the openings 39, 40 to oil inlet and outlet 50, 51 for the cylinder 23 to control the movable swash plate; 52 an oil passage for connecting the opening 41 in the change-over valve casing to an exhaust side opening 53 for the oil pump 6; 54, 54′ grooves formed around the outer periphery of the oil supply manifold 15 over an arcuate length longer than a semi-circle; 55 a flexible ball-chain fitted in each of grooves 54, 54′; 56, 56′ holes extending through the T type oil passage member 16 and the casing 8; 57, 57′ piston rods connected at one end to respective ones of the ball chains, respectively; 58, 58′ pistons connected to these rods 57, 57′, respectively; 59, 59′ oil cylinders in which pistons 58, 58′ are slidably mounted; 60 a passage interconnecting the bases of both cylinders 59, 59; 61, 61′ oil outlet and inlet for both cylinders 59, 59′; 62, 63 oil passages for connecting the oil outlet and inlet 61, 61′ to the openings 37, 38 of the change-over valve casing 32; 64 oil holes formed in the outer periphery of the T type oil passage member 16 adapted to communicate with the oil passage 22′ of the oil distributing block 22; 65 a groove formed along the inner surface of the member 16; 66 a clamping ring fitted in the groove 65 and adapted to prevent the manifold 15 from an axial displacement; 67 grooves formed around the outer periphery of the manifold 15 and adapted to receive packing rings; 68 an oil supply hole; 69 annular grooves formed between the T type oil passage member 16 and the oil distributing blocks 22 of the oil pump 6 and of the oil motor 7, 7'; 70 an oil reservoir tank; 71 an oil feeding pump; 72 a check valve; 73, 74 relief valves connected to the oil passages, respectively; 75 a shift lever for operating the change-over valve; and 76 a steering handle wheel for the running device. The relief valve 74 determines the maximum pressure of the pump at the discharge side while the relief valve 73 determines that at the suction side. The coil feeding pump 71 is continuously driven by the engine.

In the device constructed as above described, if the oil pump 6 is rotated by means of the engine 2 it causes the reciprocation of the group of plungers 12 through action of the swash plate 13. The pressurized oil thus produced is supplied to the groups of plungers 12, 12' of the oil motors 7, 7' past the outer periphery of the valve plate 18 which is located between the cylinder block 11 and the member 16, the oil passage 22' of the oil distributing block 22 and the outside high pressure oil passage 21, which results in rotation of the oil motor 7, 7'. The oil which has done its work is fed back to the suction side of the oil pump 6 through the inside low pressure oil passage 19 of the manifold 15, thereby continuously rotating the oil motors 7, 7'.

One of the diametric ends of the movable swash plate 13 of the oil pump 6 is normally biased by the spring 30 to a position $D_m$ in which the swash plate 13 is so inclined that the oil motors are rotated in a forward direction. If the load on the oil pump 6 becomes increased, the oil pressure in its outlet side oil passage 52 is increased and this produces a pressure increase in chamber 27 greater than the pressure increase in chamber 28 because of difference in effective radial surface area of the piston 25 on its upper relative to its lower side (as seen in FIGURE 2). Thus, the piston 25 moves downward against the action of the spring 30 which aids the pressure in the chamber 28 having the smaller pressure receiving area. Consequently, the inclined angle of the movable swash plate 13 becomes gradually decreased to decrease the amount of the exhaust oil. Similarly, if the load is decreased the inclined angle of the swash plate 13 becomes increased to increase the amount of the exhaust oil. Thus, it is possible to automatically change the rotating speed of the oil motor 7, 7' over a range between the maximum value to the minimum value in response to the change of loads.

If the brake pedal 45 is gradually pressed down, the change-over rod 34 is moved toward the left to gradually cut off communication between the openings 40 and 41 and gradually effecting communication between the openings 40 and 42 to permit discharge of the oil in the chamber 28 in the cylinder 23 through the openings 40 and 42 to the reservoir 70. Thus, the swash plate 13 gradually approaches its neutral position N to decrease the amount of oil fed to the oil motors 7 and 7', thereby decreasing the rotating speed thereof. Next, when the swash plate 13 comes to the neutral position, oil is not discharged from the pump. In this case, oil does not flow but fills the oil passage between the oil pump and the oil motors. Therefore, when the oil motors are revolved by the wheels, they serve as a pump to discharge oil. As the plunger at the pump side makes no movement, the back flow of oil from the oil motors comes to the wall of the plunger of the pump and becomes stagnant, and the motors cannot make revolution, that is, the wheels are braked. The strength of braking can be varied in accordance with the rate of pressing down the brake pedal 45.

In case of stopping the running device while the engine is in operation, the handle 75 is changed over to the neutral position N, wherein the change-over rod 34 is moved in a direction shown by an arrow to immediately cut off the communication between the openings 40 and 41 and bring the opening 40 into communication with the opening 42 in a manner just the same as in the case of pushing down the brake pedal 45, thereby completely stopping the oil motors 7 and 7'. Thus, according to the invention, it is not necessary to provide any clutch mechanism as in the case of automobiles heretofore used.

If the handle 75 is changed over to a reverse position R, the change-over rod 33 is moved to a direction shown by an arrow to cut off the communication between the openings 38 and 41 through the change-over cylinder 31 thereby bringing the opening 37 into communication with the opening 41. The oil pressure, therefore, is supplied to the oil cylinder 59' only to press the piston rod 57' upwards to push the group of balls 55', thereby rotating the manifold 15 in the T type oil passage member 16 over 180°. Thus, the relative position between the valve plate 18, and consequently also the eccentricity of its pins 17, 17 relative to the motor shafts 10, 10', is reversed, thereby causing the oil motors 7, 7' to rotate in the opposite direction.

As above mentioned, the device embodying the invention makes use of the group of balls 55 and of the oil pressure cylinders 59 and 59' such that the displacement of the rotating center axis of the valve plate causes the direction of rotation of the oil motors to reverse in a simple and easy manner without requiring any complex reversing mechanism.

In the device according to this invention, a central axial passage opening at end 16a in the vertical portion of the T-member 16 (see FIGURE 11), which end includes the pin 17, communicates with central opening 15a formed in the second member 15. Therefore, the axial passage in member 16 and the axial passage 19 in member 15 connect the suction side of pump 6 to the discharge side of oil motors 7, 7'. On the other hand, the discharge side of the oil pump 6 is connected to the suction sides of motors 7, 7' through passages 22', holes 64 and the axial chamber 21, so that the length of the oil passage common to the oil pump and to the oil motors can be shortened. This can reduce the loss of oil and supply the oil pressure to both oil motors 7 and 7' without any unbalance. If the resistance applied to one of the oil motors becomes larger, this oil motor receives a lesser amount of oil to decrease its rotating speed while the other oil motor receives a larger amount of oil to increase its rotating speed. For example, when the running device moves along a curved road etc. and the resistance applied to the inside wheel becomes larger, it is possible to automatically decrease the rotating speed of the inside wheel and increase that of the outside wheel, without necessitating any differential gear mechanism.

Moreover, according to the invention there are provided annular grooves 69 formed between the T type oil passage member 16 and the oil distributing blocks 22 of the oil pump 6 and of the oil motors 7, 7' and these grooves 69 are fed with the oil pressure from the exhaust side oil passages to form a high pressure oil film between the T type oil passage member 16 and the oil distributing blocks 22. Such film prevents the direct contact between these members and provides a bearing which can withstand a higher load and higher speed of rotation than any metal bearing could withstand.

Another advantage of the invention lies in that the valve plates 18 loosely fitted to the ends of the T type oil passage member 16 and of the manifold 15 are arranged eccentrically in opposition to the groups of plungers 12, 12' of the oil pump 6 and of the oil motors 7, 7', and provision is made of openings 20 formed in the valve plates 18 for communicating the groups of plungers 12, 12' with the low pressure side oil passage 19 of the manifold 15 such that the groups of plungers 12, 12' not covered by the valve plates 18 may be brought into communication with the high pressure side oil passages 22', in the oil distributing blocks 22. The above feature not only makes it possible to smoothly transmit the pressure oil between the oil pump 6 and the oil motors 7, 7', but also to supply oil pressure to the exhaust side and also to the suction side of the valve plates 18. Thus, the valve plates 18 are not subjected to oil pressure at one side thereof only, so that wear of these valve plates 18 is diminished.

As above described, the invention provides a novel running transmission device which does not require any mechanical clutches, transmission gears, differential gears and brake means and can economize the amount of fuel to be consumed and further can use high pressure oil and operate in high speed and can easily be manufactured and is small in size, light in weight, simple in construction, and less expensive.

Various other modifications may be made without departing from the spirit of the invention.

What I claim is:

1. An hydraulic power transmission device comprising an oil pump adapted to be driven by an engine and a pair of oil motors drivingly connected to said pump through a fluid coupling means, said pump comprising a rotatable pump shaft drivingly connectable to an engine and said motors each comprising a rotatable motor shaft drivingly connectable to separate driven means, the rotative axes of said motor shafts being co-linear and extending perpendicularly from either side of the rotative axis of said pump shaft, said pump and motors each comprising a rotatable cylinder housing fixedly mounted on a respective one of said shafts and including a plurality of axially extending cylinders concentrically and parallelly arranged around the corresponding rotative axis of said shafts, a reciprocal plunger in each of said cylinders, said fluid coupling means comprising a first fluid passage member defining perpendicularly crossing hollow chambers, one of said chambers being substantially co-linear with the axes of said motor shafts and the other of said chambers being substantially co-linear with the axis of said pump shaft, a second hollow fluid passage member concentrically mounted within said one chamber and defining a fluid passage open at opposite ends thereof and extending between said pump shafts, an opening in said second passage member connecting said passage in said second member with said one passage in said first passage member, both these passages constituting a low pressure passage, a circular pump valve plate mounted in a circular chamber defined between said first passage member and said pump cylinder housing and circular motor valve plates each mounted in a circular chamber formed between the opposite ends of said second passage member and the respective motor cylinder housings, said circular chambers being concentric with the corresponding shaft axes and said plates being eccentric with these same axes, a space being formed between a portion of the outer periphery of said plates and the inner periphery of said circular chambers, said plates each comprising a circumferential solid rim and axially extending through openings located radially inward of said rim, said through openings in said plates constituting connecting openings between certain ones of said cylinders in each of said housings and said low pressure passage, a high pressure passage connecting together others of said cylinders in said pump and motor cylinder housings, said high pressure passage including said space between the outer and inner peripheries of said plates and said circular chambers, respectively.

2. An hydraulic power transmission means comprising a hydraulic pump coupled to two hydraulic motors through hydraulic coupling means, said pump and motors each comprising a respective drive shaft with the rotational axis of the motor shafts being co-linear with each other, said motor shafts extending oppositely and perpendicularly away from the axis of said pump shaft, said hydraulic coupling means comprising high pressure oil passage means connecting the discharge side of said pump to the respective suction sides of said motors and low pressure oil passage means connecting the suction side of said pump to the respective discharge sides of said motors, said high and low pressure oil passage means comprising passages defined by first and second oil passage members, said second member comprising a low pressure passage extending between and connecting the respective discharge sides of said motors, said first member comprising a low pressure passage connecting the suction side of said pump with said low pressure passage in said second member, said second member being rotatively journalled in said first member about an axis perpendicular to the rotational axis of said pump shaft and mounting a motor valve plate at either end thereof and eccentrically to the rotational axis of said motor shafts, said first member having an annular groove opening axially towards the outer circumferential periphery of said second member, said groove constituting a high pressure oil passage defined by inner surface portions of said first member and by said outer periphery of said second member.

3. The hydraulic power transmission means of claim 2, including means to rotate said second member through an angle of 180 degrees to either of two respective positions, each of said positions corresponding to opposed eccentric positions of said valve plates relative to said motor shafts, each said positions corresponding to opposed rotational direction in which said motor shafts are driven by said pump shaft.

4. The hydraulic power transmission means of claim 2, wherein said pump includes a pivotal swash plate for regulating the rotational speed at which said motor shafts are driven by said pump shaft, a speed control means connected to said swash plate for adjusting the pivotal position of said swash plate, said speed control means comprising an hydraulic cylinder and a piston having opposite pressure faces slidably mounted in said cylinder, said faces having different effective pressure areas, conduit means connecting said high pressure passages to opposite ends of said cylinder.

5. An hydraulic running transmission device comprising a pair of oil motors having output shafts aligned on a straight line and arranged symmetrically in opposition, a variable displacement oil pump having an input shaft connected transversely to said output shafts, said pump being in fluid communication with said motors through a T type oil passage member, a pump valve plate, oil passages included in said oil motors and arranged in equilibrium condition; and an oil passage connecting means comprising: a valve plate for the oil pump and a valve plate for each of the oil motors, a central passage in the T-type member in communication with a central opening in an oil supply manifold, respective ones of said valve plates being mounted about respective ones of said central openings, said passage connecting means communicating a suction side of the oil pump with a discharge side of the oil motors, and wherein said T-type member includes a plurality of holes in its outer periphery, said holes communicating with a chamber formed between an inner surface of said T-type member and an outer surface of said oil supply manifold, the exhaust side of said pump communicating with the suction side of said motors through said holes and said chamber.

6. An hydraulic power transmission device comprising a pair of oil motors having output shafts aligned on a straight line and arranged symmetrically in opposition, a variable displacement oil pump having an input shaft transversely mounted relative to said output shafts and in fluid driving relationship therewith through a fluid passage connecting means, said means including oil passages in said oil motors arranged in equilibrium condition, an oil supply manifold, and a valve plate rotatively mounted at one end of the T-type member and at opposite ends of the supply manifold about respective axes which are eccentric to the respective axes of said pump and of said motors, said pump and motors comprising respective groups of plungers concentrically arranged about the respective axes of said pump and motors, said valve plates including axial through-holes communicating certain ones of the plungers in each of said groups with a low pressure oil chamber while others of said plungers are in communication with a high pressure oil chamber through passages formed around the outer periphery of each of said valve plates.

References Cited by the Examiner

UNITED STATES PATENTS

| 1,136,363 | 4/15 | Pepper | 60—53 |
| 1,227,055 | 5/17 | Kellogg | 60—53 |
| 1,867,308 | 7/32 | Durner | 60—53 |
| 2,562,363 | 7/51 | Nixon | 60—53 |
| 2,569,572 | 10/51 | Froebe | 60—53 |
| 2,907,230 | 10/59 | Kollmann | 60—53 |

FOREIGN PATENTS

| 216,631 | 6/24 | Great Britain. |

SAMUEL LEVINE, *Primary Examiner.*

ROBERT C. RIORDON, EDGAR W. GEOGHEGAN, *Examiners.*